United States Patent
Asher et al.

(10) Patent No.: US 6,751,554 B1
(45) Date of Patent: Jun. 15, 2004

(54) LOCATING DIG ALERTS ON THE MAP BY CHOOSING AN AREA ON THE MAP

(75) Inventors: Michael L. Asher, Green Grove Springs, FL (US); Uday Bhaskar, Alpharetta, FL (US); Hossein Eslambolchi, Los Altos Hills, CA (US); Bala Surya Siva Sri Gaddamanugu, Alpharetta, GA (US); Charles C. Giddens, Conyers, GA (US); Harold Jeffrey Stewart, Alpharetta, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/383,040

(22) Filed: Mar. 6, 2003

(51) Int. Cl.⁷ .............................................. G06F 19/00
(52) U.S. Cl. .............................................. 702/5; 702/6
(58) Field of Search ..................... 702/2, 5, 6

(56) References Cited

U.S. PATENT DOCUMENTS

| | | | | |
|---|---|---|---|---|
| 5,652,717 A | * | 7/1997 | Miller et al. ................... | 703/6 |
| 5,745,751 A | * | 4/1998 | Nelson et al. ............ | 707/104.1 |
| 6,014,090 A | * | 1/2000 | Rosen et al. ................. | 340/905 |
| 6,094,625 A | * | 7/2000 | Ralston ....................... | 702/150 |
| 6,496,137 B1 | * | 12/2002 | Johansson .................... | 342/22 |
| 2002/0035432 A1 | * | 3/2002 | Kubica et al. ................. | 702/5 |

* cited by examiner

Primary Examiner—Donald McElheny, Jr.

(57) ABSTRACT

The present invention is a system and method for searching a large database of dig location tickets for tickets of particular interest. A user can locate an area of concern on an on-screen map and can view a list of tickets received for a given date range of the map. For example, when underground plant damage occurs in a particular region, users need not text-search in the database to locate a particular ticket that may have caused the damage, but can instead locate the ticket using the enhanced on-screen map of the invention.

31 Claims, 12 Drawing Sheets

Excavator Contact Address: PO Box 28 —734    Excavator Contact Time:
Excavator Addressee 2:                        Excavator City: BOGART
Excavator State: GA                           Excavator Zip: 30622
           Grids: 34058413A 3405A84113A 3405A8414D 3405B8414D 3405B8414C 3405C8414B 340
Work Type: PLACING MAIN CONDUIT —736          Work Direction: UNKNOWN
737— Work Done For: BELLSOUTH                 Work Direction:
Work Distance:                                Call Back Status:
Work Dispatched?: N                           Call Back Method:
One Call ID: 122                              Status Dispatch: 60
Post Call Back Status:                        One Call SegNo: 337
Raw Date File: 20021203\parscd75-02337-118833.txt
Dig Latitude 1: 3L097000000                   Dig Longitude 1: 84.2750020000
739— Dig Latitude 2: 3L094700000              Dig Longitude 2: 84.2739300000
Parsed Latitude 1:                            Parsed Longitude 1:
Parsed Latitude 2:                            Parsed Longitude 2:
Call Back Method: 738                         Defect:
Cross Street:
Remarks: LOCATE ALONG NORTH SIDE OF WINDWARD PKWY FROM GA. HWY 400 TO NORTH POINT: PKWY RESTATE OF 09112-508-027:RESTATE OF
         09262-502-028:RESTATE OF 10142-502-006:RESTATE OF 10302-502-019:RESTATE OF 11152-502-003

Levels: Good thru 12/24/02 RESTATE by: 12/10/02

| | | | | |
|---|---|---|---|---|
| | Log Name | Time Stamp | Creator Name | Note |
| 1. | (Unknown) | 12/4/2002 5:01:17PM | GFICurrentScreener | Positive Response on the ticket was made to One Call Center(status Refuses to locate) |
| 2. | User Notes | 12/4/2002 1:41:50PM | Herb Wilder | Created at 12/04/2002 03:32PM local Time: The Location For The E.Spire Fiber Route Between Alpharette To Denwoody But The E.Spire Fiber Contract has Been Terminated AT&T No longer Locates and Protects This Fiber Route |
| 3. | (Unknown) | 12/4/2002 2:45:50PM | Herb Wilder | Created at 12/04/2002 03:31 pm Local Time: Technician updated Positive Response status to Refuse to locate |
| 4. | Status Change | 12/4/2002 7:05:48PM | Herb Wilder | Created at 12/03/2002 07:69pm Local Time: Ticket downloaded successfully to the OSWF Ticket Manager Client |
| 5. | User Notes | 12/3/2002 11:09:57AM | (process)(screener) | Assigned:Herb Wilder#(3351023) |

Log Details for Ticket Number 5829512

GFI: Ticket Location Report
From Date: 12/05/02  To Date: 12/07/02

Description: To view list of tickets on the map, click on "Map View" tab. To view tickets for a different location, click on "Map View" tab, choose the From Date, To Date and zoom to location and click "Choose Region" button on the map locator.

Note: From Date & To Date represents Tickets Work Safe. This report will give top 125 tickets which matches the search criteria. Please narrow down the search criteria to locate all Tickets.

Map View | Ticket List | Ticket Details | ✓Ticket Log | Autoscreener Log | Ticket Time | Help 820
810

FIG. 9

GFI: Ticket Location Report

Description: To view ticket details, select a row and click on "Tickets Details" Tab. To view tickets for a new location click on "Map View" tab, choose From & To dates and click on "Choose Region" button on the map toolbar From Date: 12/05/02  To Date: 12/07/02

Map Note: From Date & To Date represents Tickets Work Date. This report will give top 125 tickets which matches the search criteria. Please narrow down the search criteria to locate all Tickets.

| # | IV or NIV | Date or Work | Excavator | One Call Ref# | GFI Ticket# | Address | Work Type |
|---|---|---|---|---|---|---|---|
| 1 | Closed | 12/6/02 1:47:00PM | GWINNETT COUNTY PUB UTLS | 12062-114-829 | 5561191 | 6369 JIMMY CARTER BLVD | REPAIRING WATER MAINS |
| 2 | 38¢ Waiting | 12/6/02 11:07:00AM | BECKALB CNTY WTR & SWR | 12062-025-028 | 5058925 | 4800 ASHFORD DUNWOODY RD | REPAIR WATER SVC LINE |
| 3 | 38¢ Waiting | 12/6/02 10:11:00AM | CVA OF SOUTH FLA INC | 12062-029-013 | 5869685 | W PEACHTREE ST | INSTL MAIN & SERVICE |
| 4 | !!! System NIV | 12/6/02 10:33:00AM | BUTTON SERVES ROCKDALE PIPELINE | 12062-121-025 | 5850944 | 902 LENOX HILL CT | REPAIR WATER SERVICE LINE |
| 5 | 38¢ Waitng | 12/6/02 9:01:00AM | T C PLUMBING | 12062-191-016 | 5867174 | KIRKLAND RD | INSTALL WATER MAIN |
| 6 | !!! System NIV | 12/6/02 8:45:00AM | GEORGIA POWER | 12062-042-014 | 5856928 | 4364 ANGIE DR | REPACING WTR SERV LINE |
| 7 | 38¢ RDT | 12/6/02 7:00:00AM | GA POWER | 12062-999-001 | 5824151 | 732 OLD HORCROSS TUCKER RD | INSTALLING UU SERVICE |
| 8 | !!! System NIV | 12/6/02 7:00:00AM | MASTEC, INC | 12032-909-001 | 5029280 | 240 CANDLER RD | TRENCHING |
| 9 | Closed Dip | 12/6/02 7:00:00AM | MASTEC, INC | 12032-950-006 | 5866302 | ELLIS ST NE | INSTALL 4" PIPE & INNERDUCT |
| 10 | 38¢ RDT | 12/6/02 7:00:00AM | MASTEC, INC | 12032-950-006 | 5024041 | ELLIS ST NE | INSTALL 4" PIPE & INNERDUCT |
| 11 | Closed Dip | 12/6/02 7:00:00AM | MASTEC, INC | 12032-950-005 | 5836381 | LUCKIE ST HW | INSTALL 4" PIPE & INNERDUCT |
| 12 | 38¢ RDT | 12/6/02 7:00:00AM | MASTEC, INC | 12032-950-005 | 5824840 | LUCKIE ST HW | INSTALL 4" PIPE & INNERDUCT |
| 13 | Closed Dip | 12/6/02 7:00:00AM | MASTEC, INC | 12032-950-004 | 5856380 | PEACHTREE CENTER AVE | MANHOLE |
| 14 | 38¢ RDT | 12/6/02 7:00:00AM | MASTEC, INC | 12032-950-004 | 5024039 | PEACHTREE CENTER AVE | MANHOLE |
| 15 | Closed Dip | 12/6/02 7:00:30AM | MASTEC, INC | 12032-950-002 | 5866299 | PEACHTREE CENTER AVE | MANHOLE |
| 16 | 38¢ RDT | 12/6/02 7:00:00AM | MASTEC, INC | 12032-950-002 | 5824038 | PEACHTREE CENTER AVE | MANHOLE |
| 17 | !!! System NIV | 12/6/02 7:00:00AM | GEORGIA POWER | 12032-943-001 | 5824150 | 8870 SANDY SPRINGS CIR NE | SETTING POLES & ANCHORS |

Ticket Location Report

Map View | Ticket List | Ticket Details | Ticket Log | Autoscreener Log | Ticket Time | ✓Help

GFI: Ticket Location Report

Description: To view list of tickets on the map, click on "Map View" tab. choose from date to date, to Note: From Date & To Date represents Tickets Work Date. This report will give top 125 tickets Date, and zoom to location and click on "Choose Region" button on the map looker. which matches the search criteria. Please narrow down the search criteria to locate all Tickets.

GFI: Ticket Location Report Usage Instructions

Please follow the instruction to locate tickets on the map

- Choose from date to date these dates reflect the Work Date of the tickets.
- Zoom the map to a particular location where the tickets need to be located.
- Click on "Choose Region" button on the map in order to define area on the map.
- Now draw a box on the map to find the dig located.
- All the tickets with work dates between the selected dates found in the area defined on the map will be shown with Push Pins.
- Green colored Push Pins indicates Not! numbered Tickets> Red colored Push Pins indicates involved Tickets
- Click on "Ticket List" tab to to find tickets displayed in the tubular format.
- To locate any ticket in the map, double click on any ticket row.
- To view ticket details, click on ticket row and click on "Ticket Details" tab.
- To view ticket log details, click on ticket row and click on "Ticket Log" tab.
- To view Autoscreener Log details click on ticket row and click on "Autoscreener Log" tab.
- To view Ticket Time details< click on ticket row and click on "Ticket Time" tab.
- To locate tickets for different area, click on "Map View" tab and define area on the map.

From Date: 12/05/02 ▽  To Date: 12/07/02 ▽

1110

1120

LOCATING DIG ALERTS ON THE MAP BY CHOOSING AN AREA ON THE MAP

FIELD OF THE INVENTION

The present invention relates generally to the tracking of dig location tickets for the protection of underground utilities. Dig location tickets are created as a result of an excavator contacting an underground utility maintenance organization before conducting an excavation that may potentially harm the underground plant. More particularly, the present invention is a method of finding a specific dig location ticket in a large database of such tickets, using geographic data in a unique user interface.

BACKGROUND OF THE INVENTION

Communications and utility companies ("carriers") often own or maintain vast underground plants, including communications cables, power service cables, water pipes, gas pipes, sewers and other utilities. The carriers responsible for those underground plants actively encourage anyone digging in the ground to first notify the companies of the planned excavation. Organizations, often called "One-Call" centers, have been created to centrally receive such calls and to notify all potentially involved carriers of the planned dig. A carrier representative is often sent to the dig site in order to "stake out" the actual location of the underground plant, so excavators may avoid it.

As the notifications are received, "dig location tickets" are created for tracking the status of each notification as it is handled by a carrier company. The "ticket" is typically a record in a database containing information such as an identification of the caller, a date the notification was received, a planned excavation date and a location of the excavation. Because the initial notification may come from a variety of sources (for example, road or building construction companies, utilities, landscapers, farmers and individuals planning to dig in the yard), information about the location of the dig may be received in a variety of forms. For example, the information may be a simple description of the dig being "near" a landmark such as a building, it may be an address, or the information may be in the form of precise coordinates of the dig. When a dig location ticket is created, whatever location information is received is converted to map coordinates that best represent the described dig site, given the data received from the caller. The converted coordinates may, for example, be latitude/longitude or UTM (Universal Transverse Mercator) coordinates.

The locations of components of the buried plant are known to the responsible utility companies. For example, a company responsible for a fiber optic cable system maintains a database of buffer zones surrounding buried cables in the system. When a location of a proposed excavation falls within a buffer zone, it is carefully reviewed and any necessary actions are taken to avoid harming the underground plant.

While the present invention may be used in connection with protecting any type of underground plant, it will be described herein in connection with the protection of an underground cable system such as a fiber optic system. A large corporation such as AT&T will may receive 15,000 to 20,000 dig location tickets on an average day from 50 different One-Call Centers throughout the United States. Some of those tickets are closed automatically by the system if the dig location is not within a cable buffer zone. In other cases, technicians receive the appropriate dig location tickets for which they are responsible, and work on those tickets to protect the cables. For example, the technician may be present during the excavation, or may mark the area to show where the underground cable is buried.

Sometimes, however, a cable cut happens for various reasons. In one example, an excavator may have failed to inform the One-Call Center about the planned excavation. In that case, the cable company does not receive notification and would not have created a dig location ticket. In another example, a technician may not have been able to be present at the dig location because there was insufficient notice of the dig alert, or because the excavator dug earlier than the date contained in the dig location ticket. In yet another example, the excavator may have dug in a location other than that described in the dig location ticket.

In any event, if damage to an underground plant such as a cable cut occurs, operators in the utility's network maintenance center must find the dig location ticket, if any, that was issued for the particular excavation that caused the damage. The ticket is necessary to quickly identify the excavator and to determine when the ticket was received by the system, what the dig location coordinates were, etc. That is necessary in order to prevent further damage by the excavator, to quickly detect problems in the One-Call system, and, if necessary, to seek compensation from the excavator. It is presently very difficult to search the system for the appropriate ticket, inasmuch as the database contains several millions of tickets. To compound the problem, it is often the case that the network maintenance center operator knows very few details about the ticket.

In addition to damage to the underground plant, other circumstances may necessitate searching a dig location database by network maintenance center operators. For example, a center may have a need to locate active tickets in a certain area for purposes of allocating technician workloads.

There is therefore presently a need to enable network maintenance operators to quickly and efficiently identify a dig location ticket in a database of millions of such tickets, given the types of information typically available to the operators. To the inventors' knowledge, there is currently no system capable of such searches.

SUMMARY OF THE INVENTION

The present invention addresses the needs described above by providing a method for identifying a specific dig location ticket in a large database. The database includes dig location tickets containing geographic coordinates of dig locations and date information. The method comprises the steps of receiving from a user a date range selection and an identification of a geographic region, retrieving from the database a set of dig location tickets containing a date falling within the date range and geographic coordinates falling within the region, presenting to the user a map showing the identified region and indicators representing geographic coordinates of the retrieved tickets, and receiving from the user a selection of the specific dig location ticket.

The method may also include the step of presenting on the map a representation of an underground plant buffer zone. The step of receiving an identification of a region may include presenting to the user a map and receiving from the user at least two points on the map representing the region.

The step of receiving an identification of a region may include presenting to the user an overview map, receiving from the user at least one point on the map representing an area containing the region, and zooming the map to that area.

The indicators representing geographic coordinates of the retrieved tickets may be representations of pushpins. The indicators may have a characteristic representing non-coordinate data in corresponding tickets. That characteristic may be a color of the indicator. That non-coordinate data may be a level of involvement with an underground plant.

The method may further comprise the step of presenting to the user data contained in the specific dig location ticket. The method may also include the step of presenting to the user a tabular list of tickets having geographical coordinates within the region.

In another embodiment of the invention, a machine readable medium is provided containing configuration instructions for performing the above-described method for identifying a specific dig location ticket in a database of dig location tickets.

In yet another embodiment, a system is provided for identifying a specific dig location ticket in a database of dig location tickets containing geographic coordinates of dig locations and date information. The system includes a processor and memory containing instructions for performing the method described above.

Another embodiment of the invention is a method for identifying a specific record in a database of records. The records in the database contain geographic coordinates. The method comprising the steps of receiving from a user a coordinate range defining a geographic region, retrieving from the database a plurality of records, each record of the plurality of records containing geographic coordinates falling within the region, presenting to the user a map showing the defined region and showing indicators representing geographic coordinates of the retrieved records, and receiving from the user a selection of the specific record.

BRIEF DESCRIPTION OF THE DRAWINGS

FIG. 9 is an illustration of a ticket list computer screen in a user interface embodying the invention.

FIG. 11 is an illustration of a computer screen showing help instructions in a user interface embodying the invention.

DESCRIPTION OF THE INVENTION

Figure 1:
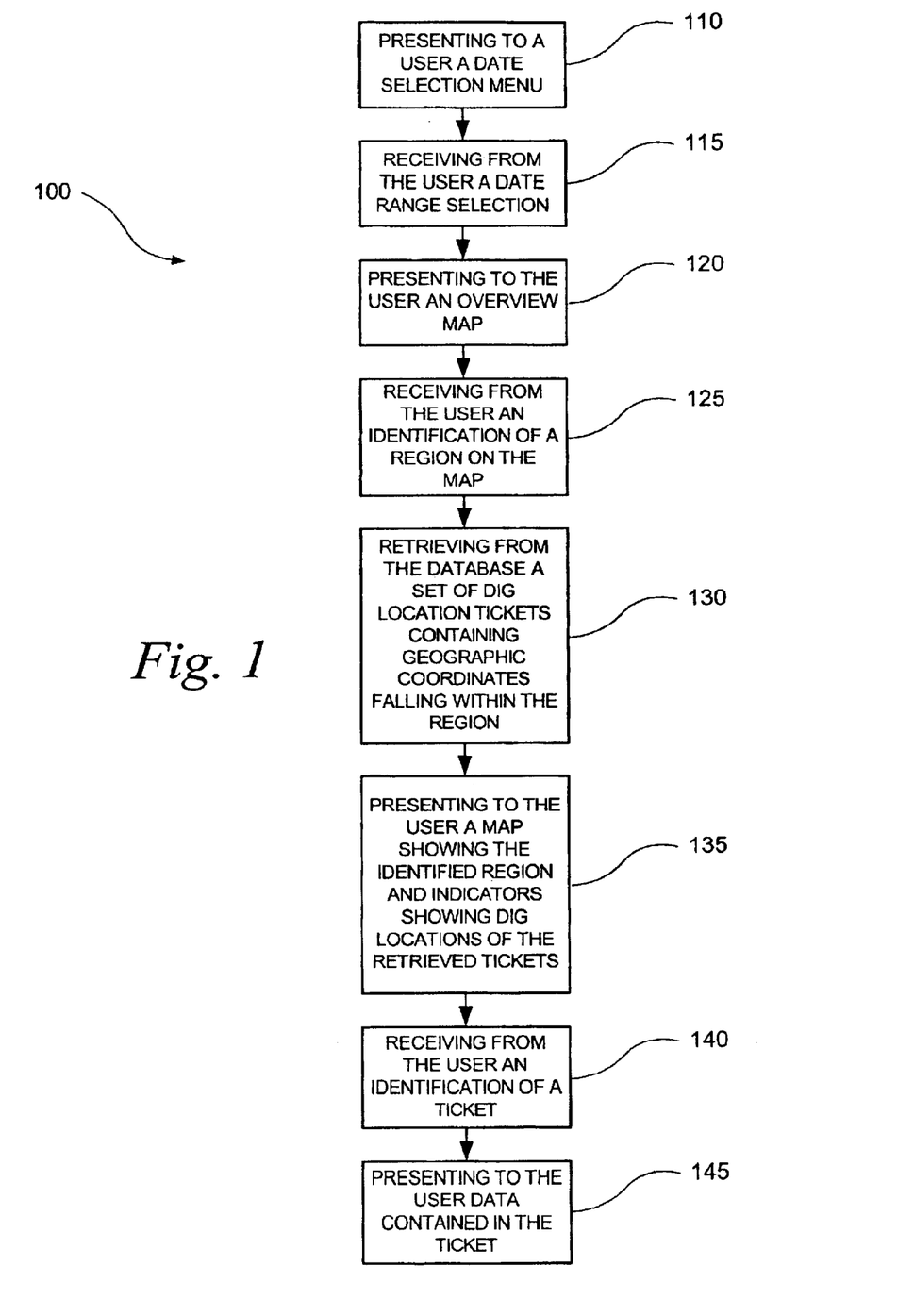
FIG. 1 is a flow chart showing one method according to the invention.

The present invention is a system and method for locating a particular dig location ticket in a large database. The ticket is located in a matter of few seconds to few minutes, using information typically available to an operator in the situations described above. The system presents to the user an easily learned user interface. The method will be described with reference to FIG. 1, which shows a block diagram depicting the method 100, and also with reference to the other figures, which show screen shots of a user interface used by an illustrative program embodying the invention.

Figure 2:
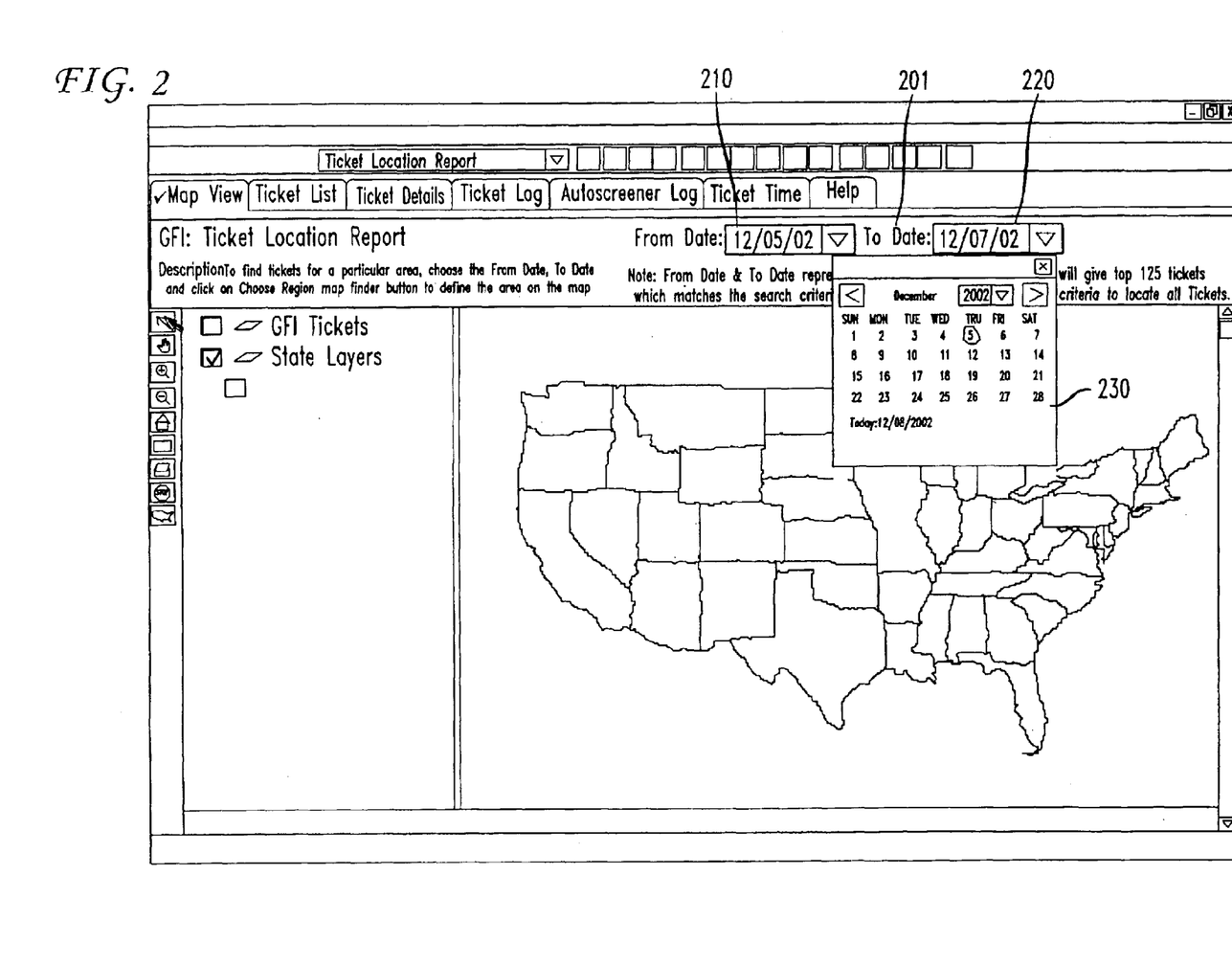
FIG. 2 is an illustration of a computer screen for entering dates in a user interface embodying the invention.

After a user starts the system, the system initially presents (step 110) to the user a date selection menu. The date selection menu 201, shown in FIG. 2, includes fields for a beginning ("from") date 210 and an ending ("to") date 220 of the period of interest to the user. The system may present pop-down calendars 230 to assist the user in entering the dates. The system then receives (step 115, FIG. 1) the date range input by the user. The date range may refer to dates that tickets originated, or may alternatively refer to projected dig dates. In one example, a user interested in finding a ticket related to a particular cable cut may enter a range containing projected dig dates within one day of the cable cut date.

Figure 3:
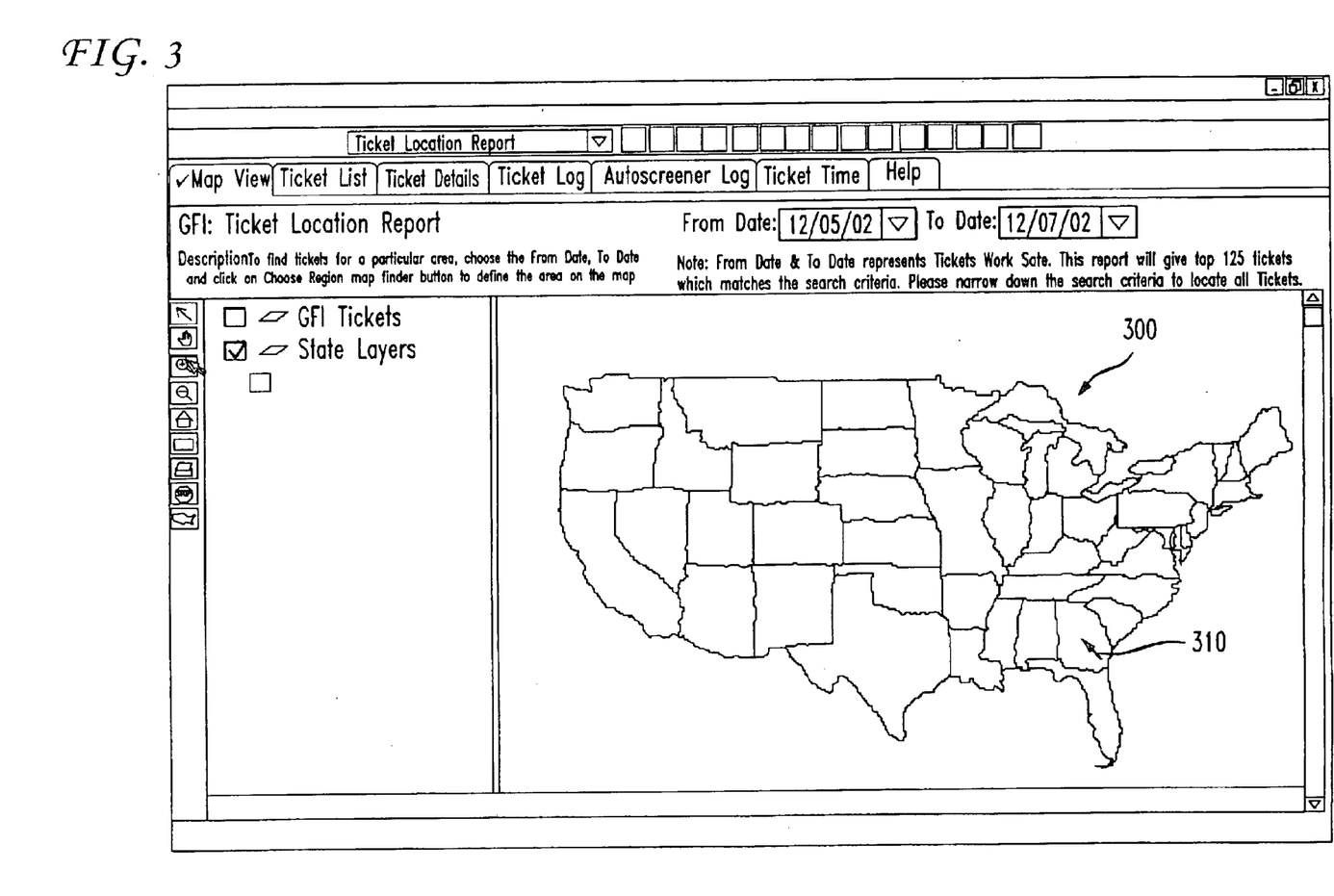
FIG. 3 is an illustration of a computer screen for selecting a geographic area in a user interface embodying the invention.
Figure 4:
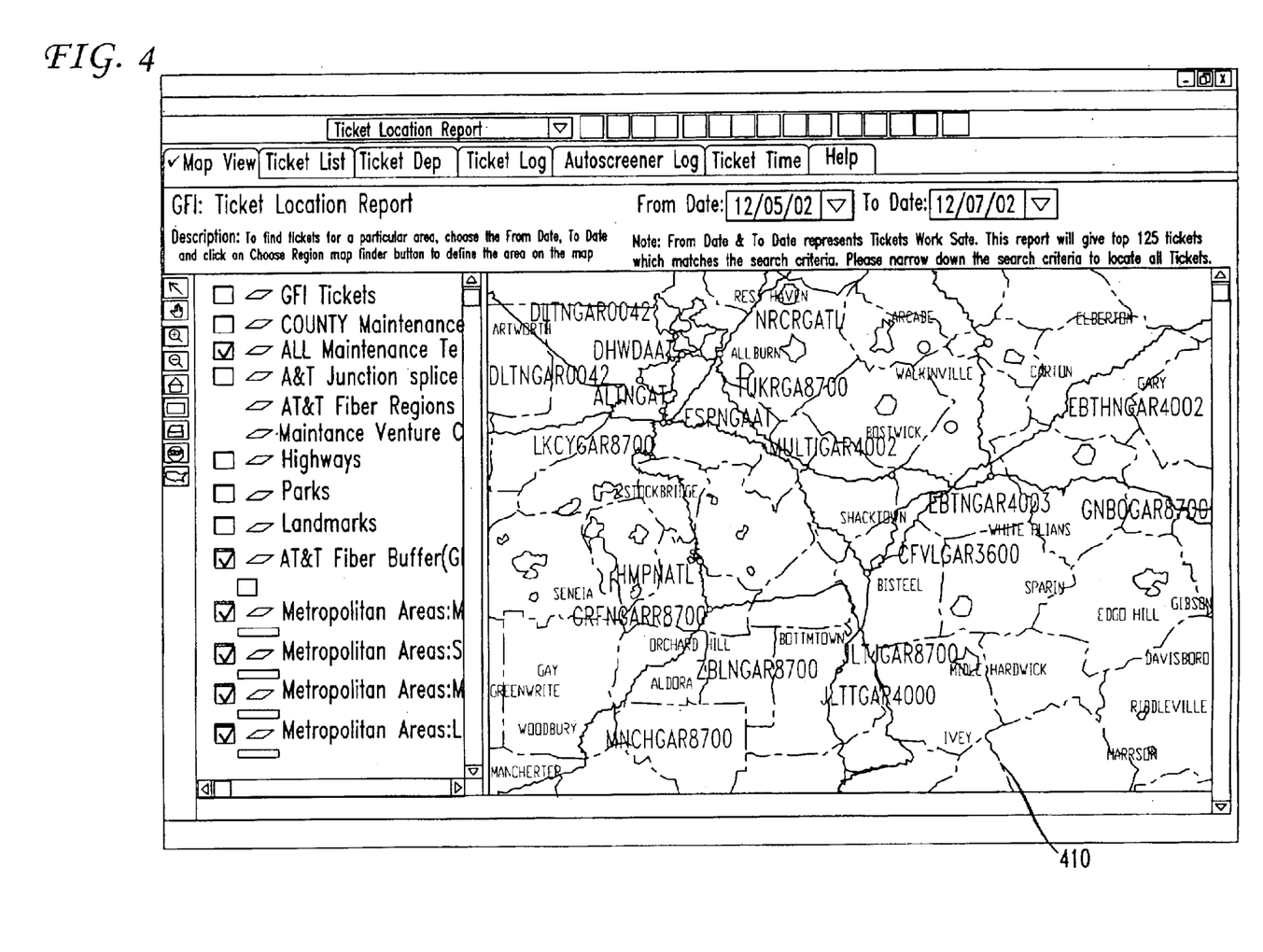
FIG. 4 is an illustration of a computer screen showing a geographic area in a user interface embodying the invention.

The system next presents (step 120) to the user an overview map showing all possible dig locations for a given underground system. For example, in a nationwide underground fiber cable system, the overview map 300 (FIG. 3) shows a complete representation of the continental United States. An overview map for a worldwide system may show a world map; an overview map for a local cable company system may show a smaller area such as a state or group of counties. By identifying an area of interest on the map with a cursor 310 and clicking, a user can zoom to that area for further definition. A representation of the selected area, such as area 410 shown in FIG. 4, is then rendered on the user's screen. The zoomed representation of the area may include additional details to assist the user in using the map, such as major roads, cities, major trunk lines owned by the carrier, etc.

Figure 5:
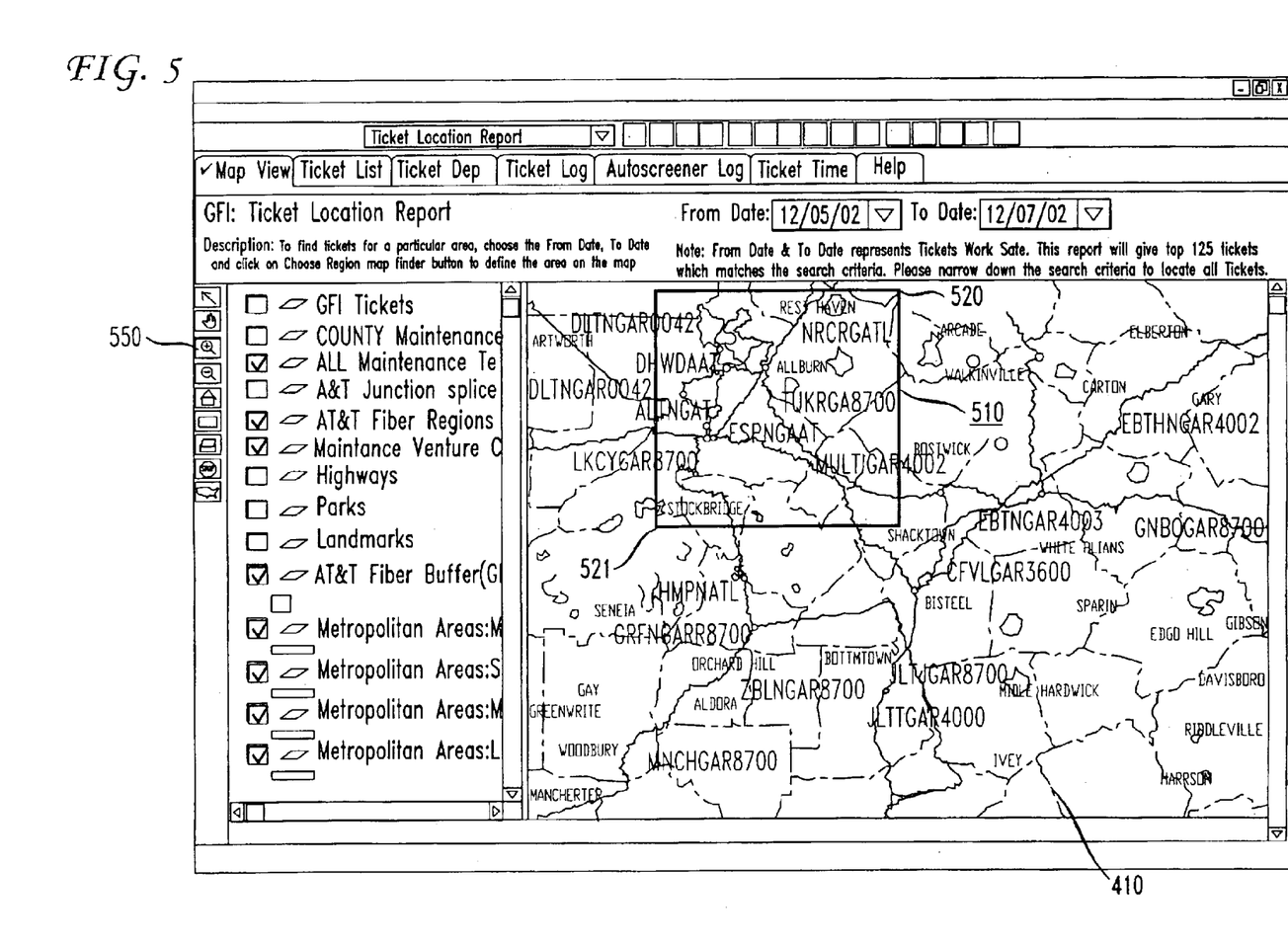
FIG. 5 is an illustration of a computer screen for selecting a coordinate region in a user interface embodying the invention.

Using the area map 410, the user may now identify (step 125) a region on the map by drawing a rectangle 510 (FIG. 5) on the map or by identifying corner vertices such as vertices 520, 521. A tool 550 in a tool bar is provided for that purpose. The region 510 defines a subset of the dig location tickets in the database having geographic coordinates falling within the region. The system retrieves (step 130) those tickets belonging to the geographically defined subset and having a date within the date range defined by the user.

The identified region 605 (FIG. 6) is then displayed (step 135) to the user with correspondingly greater map detail. For example, smaller municipalities, local roads and natural features might be shown on the region map. In addition, the retrieved dig location tickets matching the geographic and date conditions defined by the user appear on the map as representative icons or indicators such as pushpins 610. Other icons, such as flags, geometric elements or graphical representations of digging equipment may also be used to represent locations of dig tickets on the region map. One or more characteristics of the icons may be varied to represent additional data of interest to the user; i.e., data other than the dig coordinates represented by the location of the icon on the map. For example, the icons may be color-coded pushpins with red colored pushpins indicating tickets involved by the system and sent to the technicians; i.e., tickets located within an underground plant buffer zone. In that example, green colored pushpins may indicate the tickets not involved by the system; i.e., the tickets are not located within any buffer zone. A user is thereby able to view all relevant dig location tickets within the identified region, and is able to select those tickets that are most likely to be involved in, for example, a cable cut. Other non-coordinate data may also be represented by characteristics of the icons. For example, icons may be color-coded to show ticket age, size of excavation, restorability of the cable system at that point, etc. Furthermore, other icon characteristics may be used to convey information about the tickets, such as the size, type or orientation of the icon.

Figure 7:
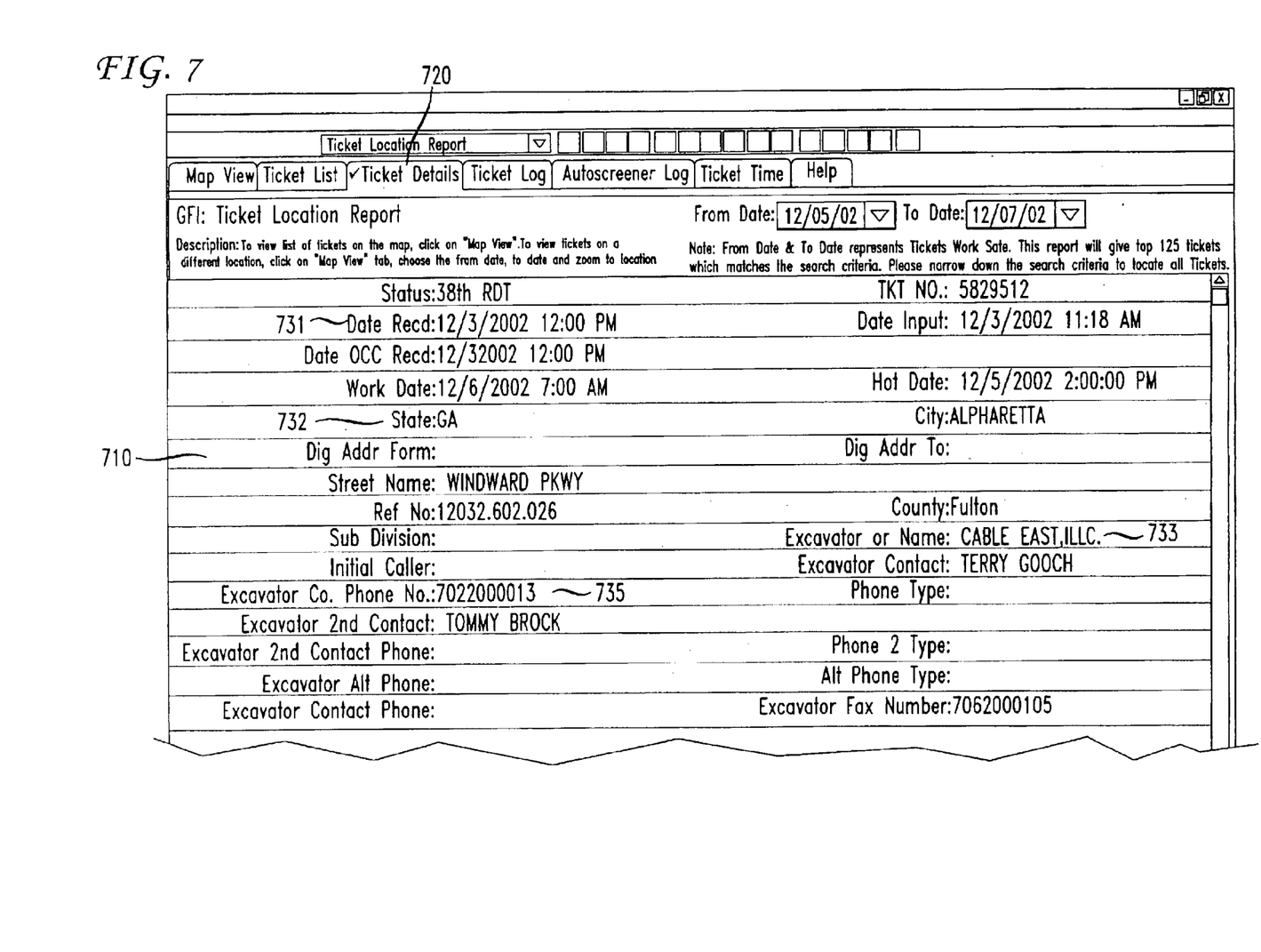
FIG. 7 is an illustration of a ticket detail computer screen in a user interface embodying the invention.
Figure 8:
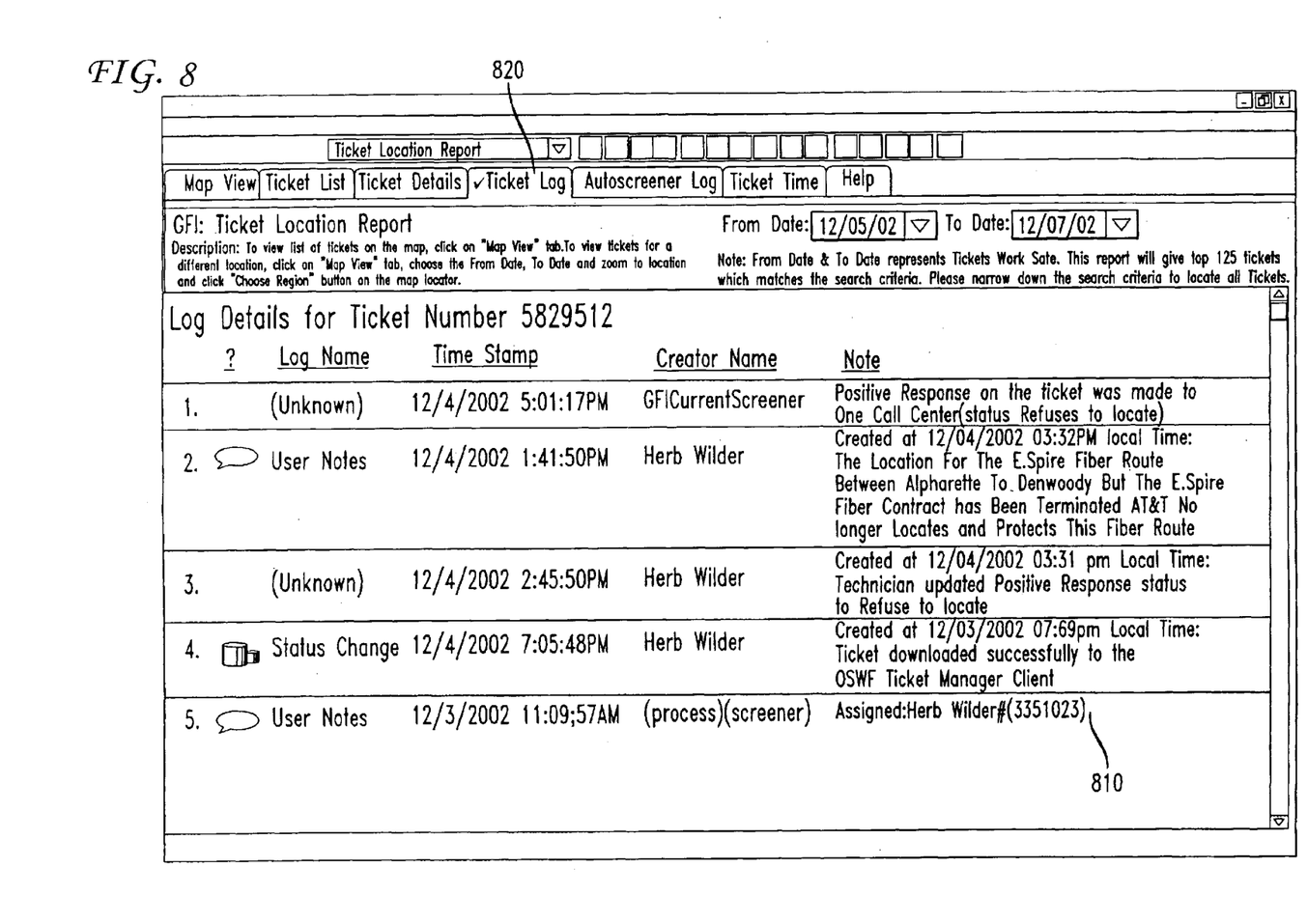
FIG. 8 is an illustration of a ticket log computer screen in a user interface embodying the invention.

A user may identify (step 140) a ticket of interest on the region map by, for example, double clicking on a corresponding icon 610. In response to that action, a tabular HTML report 710 (FIG. 7) becomes available under a "ticket details" tab 720. The report 710 contains all ticket details available for that dig location ticket, including, for example, the ticket receipt date 731, the proposed dig date 732, the excavation company name 733, address 734, and telephone number 735, the type of work to be done 736, the primary contractor 737, and the proposed dig location in words 738 and in coordinates 739. For that ticket, a ticket log 810 (FIG. 8) is also available under a "ticket log" tab 820. The log 810 shows a history of the ticket by listing entries entered as significant events take place. Finally, under a "ticket list" tab 920, a list 910 of all tickets found in the identified region and falling within the entered time period is displayed. The list 910 contains a tabulation of important ticket data such as date of work 950, excavator name 951, ticket reference numbers 953, 954, the dig location address 955 and work type 956.

Figure 6:
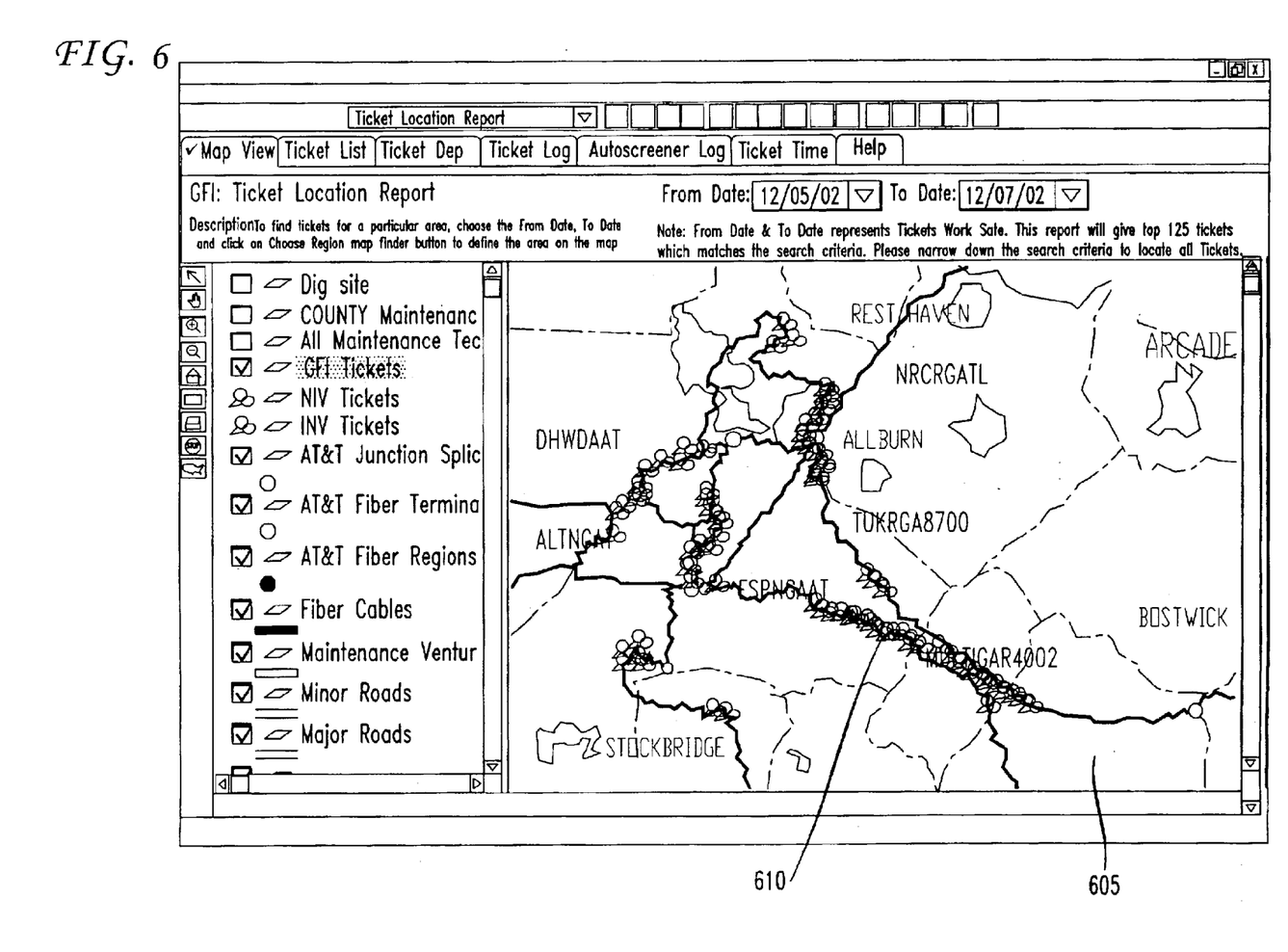
FIG. 6 is an illustration of a computer screen showing a coordinate region with ticket indicators in a user interface embodying the invention.
Figure 10:
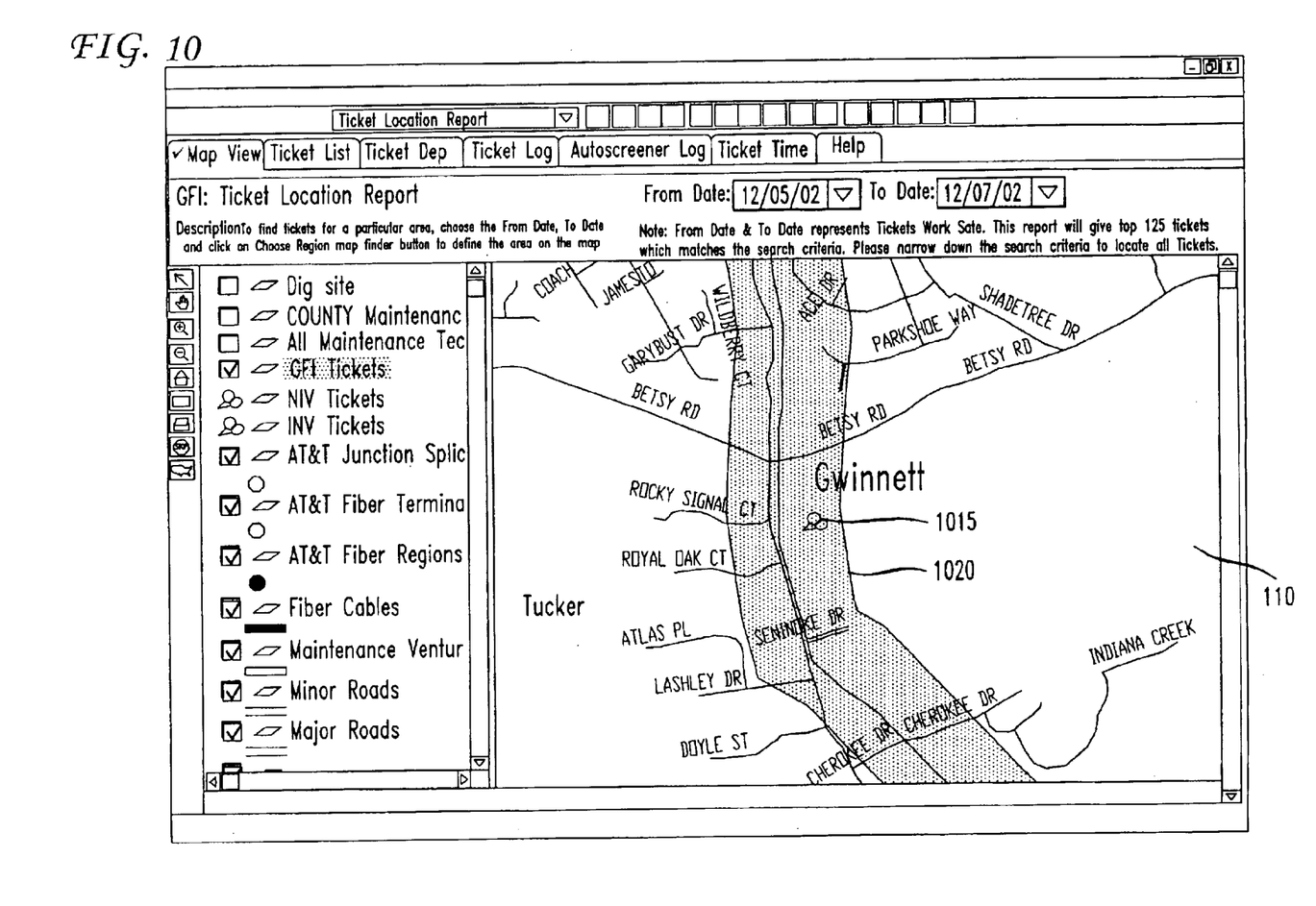
FIG. 10 is an illustration of a computer screen showing a zoomed map in a user interface embodying the invention.

A map location of a dig location ticket may be further examined by double clicking on a ticket in the list 910 or by double clicking on a ticket icon in the region map 605. A map 1010 (FIG. 10) will be shown in the display, zoomed to the appropriate area to show the selected ticket icon 1015. At that detail level, the zoomed map highlights cable buffer zones such as zone 1020 by displaying a shaded zone on the map. In that way, a dig location can be evaluated relative to nearby cable locations. In the case where a cable cut is being investigated, dig location tickets that may be involved in the cut may be quickly identified by the user.

To assist the user in finding a particular dig location ticket with the system and method of the invention, usage instructions 1120 are available under a help tab 1110. The usage instructions provide a step-by-step procedure to be followed by a user in a situation such as a cable cut event, to identify dig location tickets that may be involved.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the system and method for locating dig alerts is described with reference to an underground cable plant, that technique may be used with other underground utility types and, more generally, with other geographically-based systems, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A method for identifying a specific dig location ticket in a database of dig location tickets containing geographic coordinates of dig locations and date information, the method comprising the steps of:

receiving from a user a date range selection and an identification of a geographic region;

retrieving from the database a set of dig location tickets containing a date falling within the date range and geographic coordinates falling within the region;

presenting to the user a map showing the identified region and indicators representing geographic coordinates of the retrieved tickets; and receiving from the user a selection of the specific dig location ticket.

2. The method of claim 1, further comprising the step of presenting on the map a representation of an underground plant buffer zone.

3. The method of claim 1, wherein the step of receiving an identification of a region comprises presenting to the user a map and receiving from the user at least two points on the map representing the region.

4. The method of claim 1, wherein the step of receiving an identification of a region comprises presenting to the user an overview map, receiving from the user at least one point on the map representing an area containing the region, and zooming the map to that area.

5. The method of claim 1, wherein the indicators representing geographic coordinates of the retrieved tickets are representations of pushpins.

6. The method of claim 1, wherein the indicators representing geographic coordinates of the retrieved tickets have a characteristic representing non-coordinate data in the corresponding ticket.

7. The method of claim 6, wherein the characteristic is a color of the indicator.

8. The method of claim 6, wherein the non-coordinate data is a level of involvement with an underground plant.

9. The method of claim 1, further comprising the step of presenting to the user data contained in the specific dig location ticket.

10. The method of claim 1, further comprising the step of presenting to the user a tabular list of tickets having geographical coordinates within the region.

11. A machine readable medium containing configuration instructions for performing a method for identifying a specific dig location ticket in a database of dig location tickets containing geographic coordinates of dig locations and date information, the method comprising the steps of:

receiving from a user a date range selection and an identification of a geographic region;

retrieving from the database a set of dig location tickets containing a date falling within the date range and geographic coordinates falling within the region;

presenting to the user a map showing the identified region and indicators representing geographic coordinates of the retrieved tickets; and receiving from the user a selection of the specific dig location ticket.

12. The machine readable medium of claim 11, wherein the method further comprises the step of presenting on the map a representation of an underground plant buffer zone.

13. The machine readable medium of claim 11, wherein the step of receiving an identification of a region comprises presenting to the user a map and receiving from the user at least two points on the map representing the region.

14. The machine readable medium of claim 11, wherein the step of receiving an identification of a region comprises presenting to the user an overview map, receiving from the user at least one point on the map representing an area containing the region, and zooming the map to that area.

15. The machine readable medium of claim 11, wherein the indicators representing geographic coordinates of the retrieved tickets are representations of pushpins.

16. The machine readable medium of claim 11, wherein the indicators representing geographic coordinates of the retrieved tickets have a characteristic representing non-coordinate data in corresponding tickets.

17. The machine readable medium of claim 16, wherein the characteristic is a color of the indicator.

18. The machine readable medium of claim 16, wherein the non-coordinate data is a level of involvement with an underground plant.

19. The machine readable medium of claim 11, wherein the method further comprises the step of presenting to the user data contained in the specific dig location ticket.

20. The machine readable medium of claim 11, wherein the method further comprises the step of presenting to the user a tabular list of tickets having geographical coordinates within the region.

21. A system for identifying a specific dig location ticket in a database of dig location tickets containing geographic coordinates of dig locations and date information, the system comprising a processor and memory containing instructions for performing a method comprising the steps of:
   receiving from a user a date range selection and an identification of a geographic region;
   retrieving from the database a set of dig location tickets containing a date falling within the date range and geographic coordinates falling within the region;
   presenting to the user a map showing the identified region and indicators representing geographic coordinates of the retrieved tickets; and
   receiving from the user a selection of the specific dig location ticket.

22. The system of claim 21, wherein the method further comprises the step of presenting on the map a representation of an underground plant buffer zone.

23. The system of claim 21, wherein the step of receiving an identification of a region comprises presenting to the user a map and receiving from the user at least two points on the map representing the region.

24. The system of claim 21, wherein the step of receiving an identification of a region comprises presenting to the user an overview map, receiving from the user at least one point on the map representing an area containing the region, and zooming the map to that area.

25. The system of claim 21, wherein the indicators representing geographic coordinates of the retrieved tickets are representations of pushpins.

26. The system of claim 21, wherein the indicators representing geographic coordinates of the retrieved tickets have a characteristic representing non-coordinate data in corresponding tickets.

27. The system of claim 26, wherein the characteristic is a color of the indicator.

28. The system of claim 26, wherein the non-coordinate data is a level of involvement with an underground plant.

29. The method of claim 21, wherein the method further comprises the step of presenting to the user data contained in the specific dig location ticket.

30. The method of claim 21, wherein the method further comprises the step of presenting to the user a tabular list of tickets having geographical coordinates within the region.

31. A method for identifying a specific dig location ticket in a database of dig location tickets containing geographic coordinates of dig locations and date information, the method comprising the steps of:
   receiving from a user a date range selection and an identification of a geographic region;
   retrieving from the database a set of dig location tickets containing a date falling within the date range and geographic coordinates falling within the region;
   presenting to the user an electronic map showing the identified region and electronic indicators representing geographic coordinates of the retrieved tickets; the indicators having a characteristic showing whether represented tickets are involved by an underground utility plant buffer zone;
   receiving from the user a selection of the specific dig location ticket; and
   presenting to the user details of the selected dig location ticket including a ticket receipt date, a proposed dig date, an excavation company name, and a proposed dig location in words.

* * * * *